(12) United States Patent
Chu

(10) Patent No.: US 10,451,715 B2
(45) Date of Patent: Oct. 22, 2019

(54) USING INTEGRATED SILICON LED TO CALIBRATE PHASE OFFSET IN OPTICAL RECEIVER IN LASER RANGE FINDER

(71) Applicant: Plethron Inc., a Delaware Corporation, Palo Alto, CA (US)

(72) Inventor: Charles Chu, Cupertino, CA (US)

(73) Assignee: PLETHRON INC., Palo Alto, CA (US)

( * ) Notice: Subject to any disclaimer, the term of this patent is extended or adjusted under 35 U.S.C. 154(b) by 336 days.

(21) Appl. No.: 15/458,969

(22) Filed: Mar. 14, 2017

(65) Prior Publication Data

US 2017/0261605 A1 Sep. 14, 2017

Related U.S. Application Data

(60) Provisional application No. 62/307,577, filed on Mar. 14, 2016.

(51) Int. Cl.
*G01S 7/497* (2006.01)
*G01S 17/36* (2006.01)

(52) U.S. Cl.
CPC .............. *G01S 7/497* (2013.01); *G01S 17/36* (2013.01)

(58) Field of Classification Search
CPC .............. G01C 3/08; G01S 7/48; G01S 7/497
See application file for complete search history.

(56) References Cited

U.S. PATENT DOCUMENTS

| | | | | |
|---|---|---|---|---|
| 2001/0013929 A1* | 8/2001 | Torsten | .................... | G01C 3/08 356/5.01 |
| 2013/0258312 A1* | 10/2013 | Lewis | .................... | G01S 17/10 356/4.01 |
| 2014/0307248 A1* | 10/2014 | Giger | .................... | G01S 17/10 356/5.01 |

* cited by examiner

*Primary Examiner* — Luke D Ratcliffe
(74) *Attorney, Agent, or Firm* — DLA Piper LLP US

(57) ABSTRACT

Embodiments of the present disclosure use an "on chip" silicon LED to generate a light signal for calibration of a range finder. The light signal from the silicon LED may be detected by photo detectors in a reference path and a receive path of the range finder to generate a calibration phase offset, which may be subtracted out from a phase offset measurement of the range finder to correct the phase offset measurement for component mismatch due to, for example, environment, process variation, aging, etc.

17 Claims, 11 Drawing Sheets

USING INTEGRATED SILICON LED TO CALIBRATE PHASE OFFSET IN OPTICAL RECEIVER IN LASER RANGE FINDER

RELATED APPLICATION

This application claims priority under 35 U.S.C. § 119(e) to U.S. Provisional Application No. 62/307,577 filed on Mar. 14, 2016, the entire specification of which is incorporated herein by reference.

FIELD

The present disclosure generally relates to laser range finders and, more particularly, to phase offset calibration in laser range finders.

BACKGROUND

Present laser range finders use either the time of flight method for finding the distance to an object or a Radio Frequency (RF) modulated light signal wherein the phase of the transmitted and reflected light signals are compared to extract distance using the speed of light. The later method is more widespread since it is easier to implement. A factor that determines the distance measurement accuracy is the calibration means. There are many random variables that degrade accuracy such as temperature, component drift, and internal gain settings. To achieve 1 mm or better accuracy, frequent calibration is required. This requires that the laser range finder be self-calibrating. A requirement for inclusion in a mobile device (e.g., cell phones) is to have the range finder be highly integrated and use very little power.

An optoelectronic distance measurement system for use in a mobile device (e.g., mobile phone) includes a lens system, a laser diode emitting a high frequency intensity modulated measurement optical light signal, and at least one receiver photodetector for receiving the measurement light signal reflected from a measurement object surface. A small portion of the optical signal from the laser is coupled to a reference photodetector and mixed with a reference local oscillator frequency which has a small offset frequency from that of the laser modulation frequency to generate an intermediate frequency reference signal for phase measurement. The receiver photodetector converts the high frequency optical signal reflected from the measurement object surface to a high frequency electrical signal. The receiver high frequency photodetector signal is mixed in a high frequency demodulator with the reference local oscillator to generate an intermediate frequency signal while preserving the phase delay information. A microcontroller combined with a Analog-to-Digital Converter (ADC) measures the phase difference of the intermediate frequency between the laser transmitting reference or calibration signal and the received reflected signal. The phase difference between these signals is directly proportional to the distance to be measured factoring in the speed of light.

For a laser range finder in mobile phone applications, it is desirable that the laser emitting power is limited to the Food and Drug Administration Class 1. It is generally required to have laser optical power below 1 milliWatt in the visible spectrum range for continuous wave operation. In order to be able to fit into the form factor of a mobile phone, there should not be any mechanical moving part or parts in the laser range finder. The lens assembly is also limited by the dimensional limitations of a typical mobile phone. It is preferred that the diameter of the lens not exceed 4 millimeter, while the height of entire range finder assembly not exceed 3 millimeter.

Since the optical signal strength at the photodetector drops off at one over the square of the range distance ($1/R^2$), the photodetector and subsequent amplifier should have significant dynamic range to ensure that the range finder has 1 millimeter resolution for a range from 10 millimeter to 10 meters. In addition, the surface optical reflectance of a measurement object is an unknown. A dedicated automatic gain control mechanism is needed to adjust the gain of the photodetector to ensure that there is a sufficient signal to noise ratio to recover the phase information.

In addition to recovering the optical signal, it is desirable for the range finder to have the phase information be consistent at different gain settings. It is also desirable to calibrate the photodetector and subsequent intermediate frequency filter's phase to ensure that the laser range finder operation be substantially independent of measurement object surface reflectance, optical component variations, and electronic component variation and aging effects.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
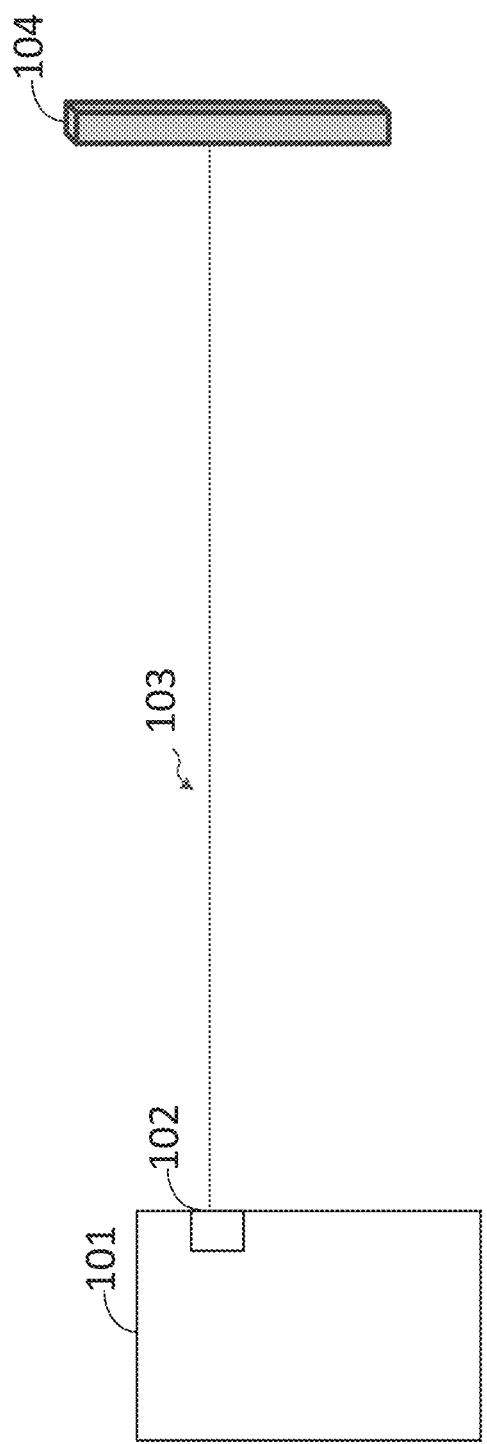
FIG. 1 shows an example of a laser range finder in a mobile device.

FIG. 1 shows an example in which a miniaturized laser range finder 102 in a cellular phone 101 or other mobile device uses a laser beam 103 to measure the distance between the cellular phone 101 and a target object 104.

Figure 2:
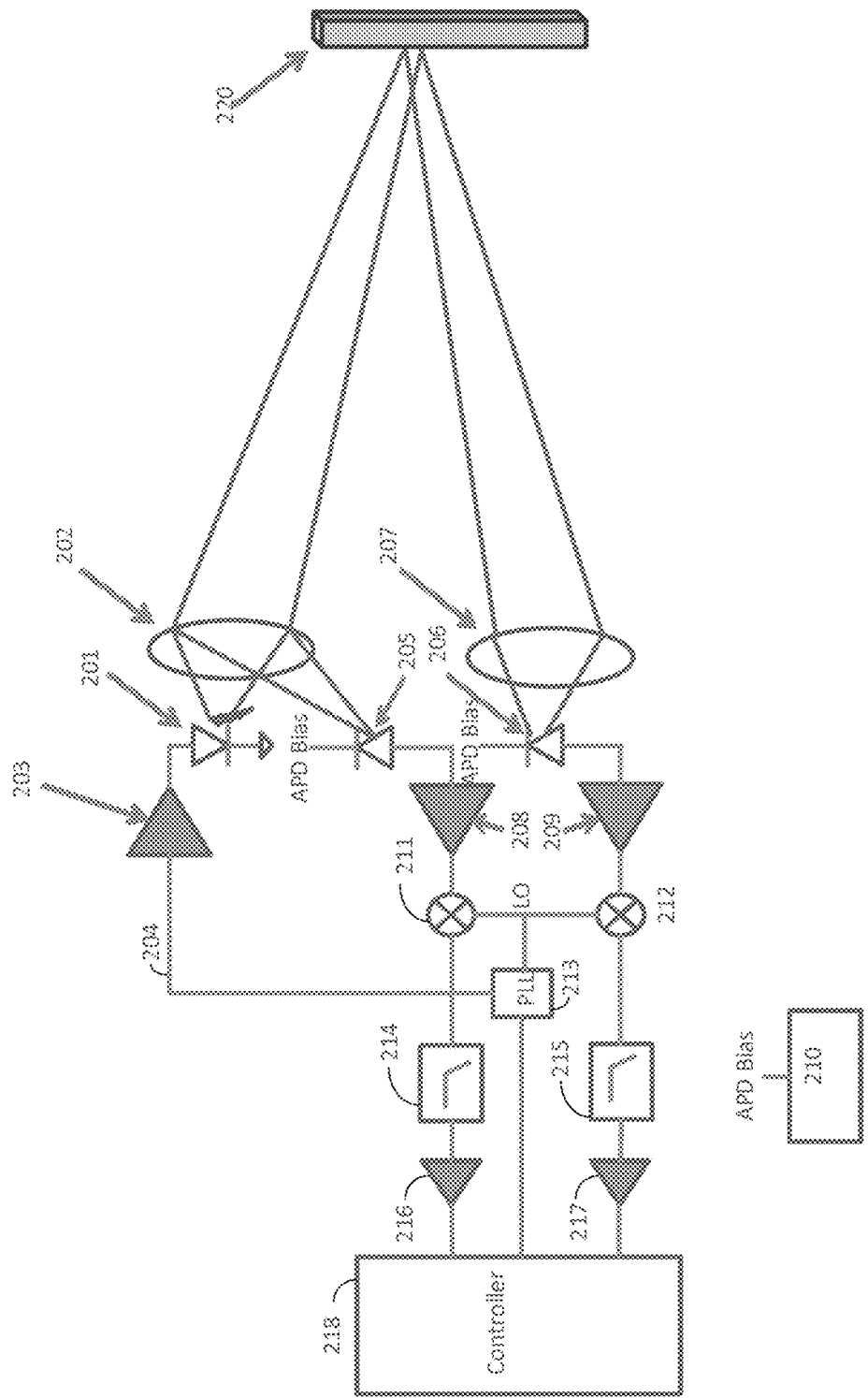
FIG. 2 shows an example of a laser range finder system.

FIG. 2 shows an example of a laser range finder system including a laser 201 (e.g., diode laser). The laser 201 is driven at a laser modulation frequency by a driver 203. The laser modulation frequency 204 is generated by a PLL 213 (or another frequency synthesizer) and is between 100 MHz to a few GHz, depending on the capability of the laser and the electronics. The modulation frequency 204 is generated by an offset frequency from a local oscillator frequency (labeled LO in FIG. 2) using the PLL 213. The offset frequency is generally between 1 kHz~50 kHz.

The laser range finder system also includes a reference photodetector 205, and a target photodetector 206. In some embodiments, each of the photodetectors may be implemented with an Avalanche Photo Diode (APD) biased by a APD bias voltage (labeled "APD Bias" in FIG. 2) generated by a voltage supply 210.

In operation, a lens 202 focuses the optical light signal (beam) output by the laser 201 on a target object 220. A small portion of the light signal is scattered by the lens 202 and detected by reference photodetector 205. The reference photodetector 205 converts the detected light signal into an electrical signal at the laser modulation frequency, which is amplified by a TIA 208 and mixed with the local oscillator frequency in a high frequency mixer 211 to generate an intermediate frequency (IF) signal. The IF signal is filtered by an IF filter 214, amplified by an amplifier 216, and converted into a digital signal by an ADC (not shown) for processing in the digital domain by a controller 218, as discussed further below The lens 207 focuses the light signal reflected off the target 220 to the target photodetector 206 for detection by the target photodetector 206. The target photodetector 206 converts the detected light signal into an electrical signal at the laser modulation frequency, which is amplified by a TIA 209 and mixed with the local oscillator frequency in a high frequency mixer 212 to generate an intermediate frequency (IF) signal. The IF signal is filtered by an IF filter 215, amplified by an amplifier 217, and converted into a digital signal by an ADC (not shown) for processing in the digital domain by the controller 218.

The controller 218 computes the phase offset between the reference signal and the target signal, which provides time of flight information for the light signal reflected off of the target. The controller 218 then uses the phase offset and speed of light to estimate the distance to the target. The controller 218 may output the estimated distance to another processor (e.g., for display to a user).

In order for the laser range finder system to function independent of the outside influence in the receiver path, it may be necessary to calibrate both the RF and IF circuits. In this regard, embodiments of the present disclosure use an "on chip" integrated silicon LED to calibrate the phase offset setting of the photodetector at different gain settings and the IF filters to ensure resolution of 1 millimeter or better. In certain embodiments, an "on chip" silicon LED is used to generate a reference light signal for calibration, as described further below. The silicon LED may produce light in the forward mode (IR) or in reverse, avalanche mode (visible light). The use of an "on chip" silicon LED for calibration provides for component cost reduction and size reduction.

As an example, 300 MHz results in an "electronic wavelength length" of 1 meter in free space. In order to resolve better than 1 millimeter, the laser range finder needs to be able to resolve phase angle between the received modulated intensity optical signal and the reference optical signal better than 0.36 degree (1/1000 of a full circle 360 degree). Measurement errors introduced by the system include temperature, variations in photodetector gain, mismatching and manufacturing variation of components, and aging effects on the system. Lookup tables and mathematic algorithms are not capable of ensuring measurement accuracy under all conditions.

The function of a photodetector in the receiver at RF is to convert the reflected RF modulated optical signal from the measurement object surface to an RF electrical signal. A variable gain function is also needed in order to increase the dynamic range requirement of the receiver. It is also another function for the receiver to be used as a high-frequency mixer. An exemplary implementation is shown in FIG. 3.

Figure 3:
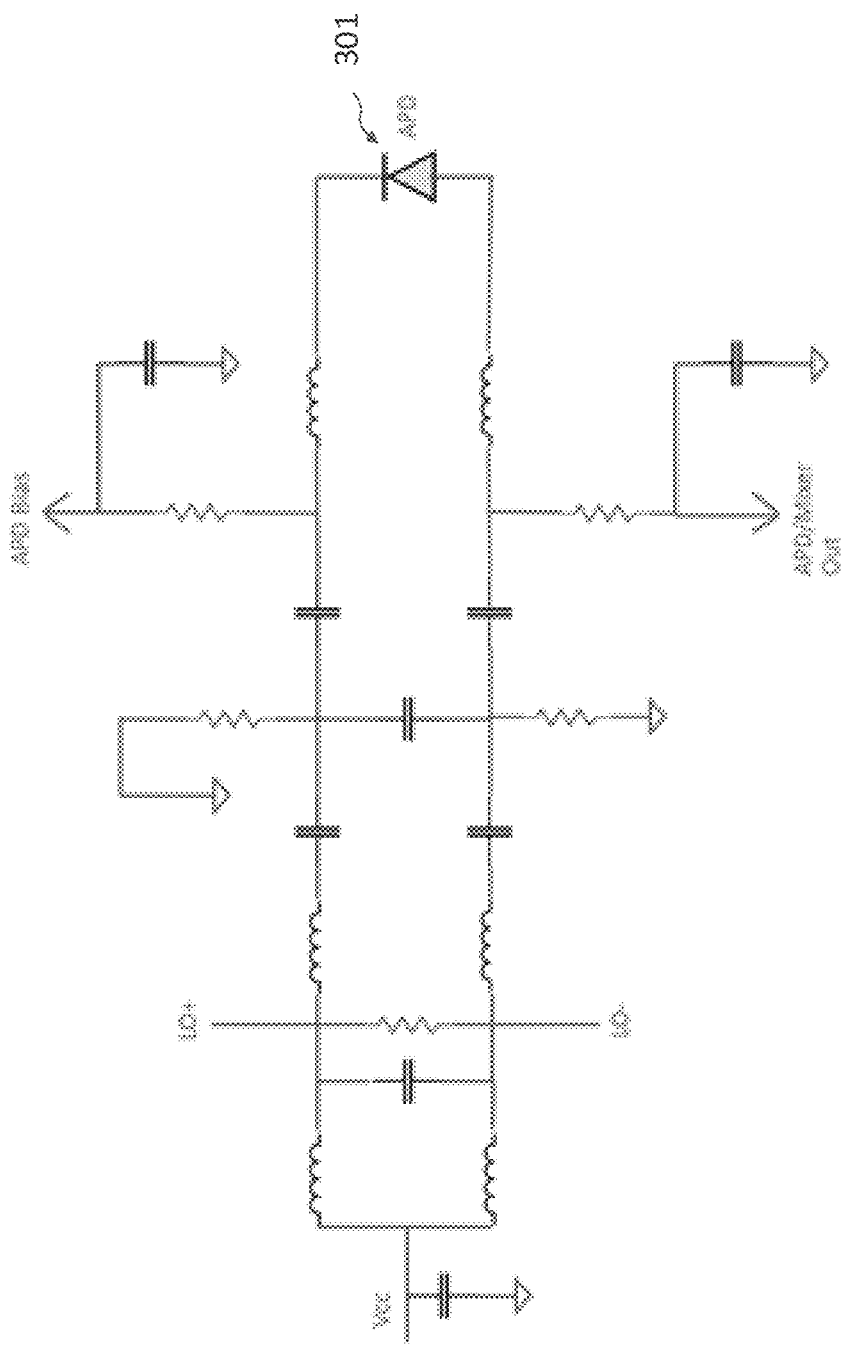
FIG. 3 shows an example of an avalanche photo diode with bias and frequency mixer circuitry.

The exemplary circuit shown in FIG. 3 acts as an optical/electrical converter, variable gain amplifier, and RF high frequency mixer. In this example, the photodetector is implemented with an APD 301 that is biased by APD bias voltage. When the APD 301 is biased below its junction breakdown voltage, it is in linear mode, in which the electrical output signal is linearly proportional to the input optical signal. It is desirable that variable gain is achieved by biasing the APD until a useable signal to noise level is achieved. Typically, the avalanche gain of the APD increases with APD bias. Therefore, adjusting the APD bias is a simple and effective means to achieve gain control. When the bias voltage is sufficiently low, the linear APD can behave like an attenuator. Such a dynamic attenuator is needed when the measured object surface is at very close range to the photodetector. For this case, the signal needs to be attenuated to avoid overwhelming the subsequent signal path. This method of gain control is simple yet effective in extending the dynamic range of receiver. Local oscillator (LO) signals can be also be injected through the use of differential bias-T for performing mixing.

The exemplary circuit shown in FIG. 3 may be used to implement the photodetector 205, TIA 208 and mixer 211 shown in FIG. 2. The circuit may also be used to implement the photodetector 205, TIA 209 and mixer 212 in FIG. 2. In this example, the voltage supply 210 may provide the APD bias, which can be adjusted to achieve variable gain, as discussed above.

Figure 4:
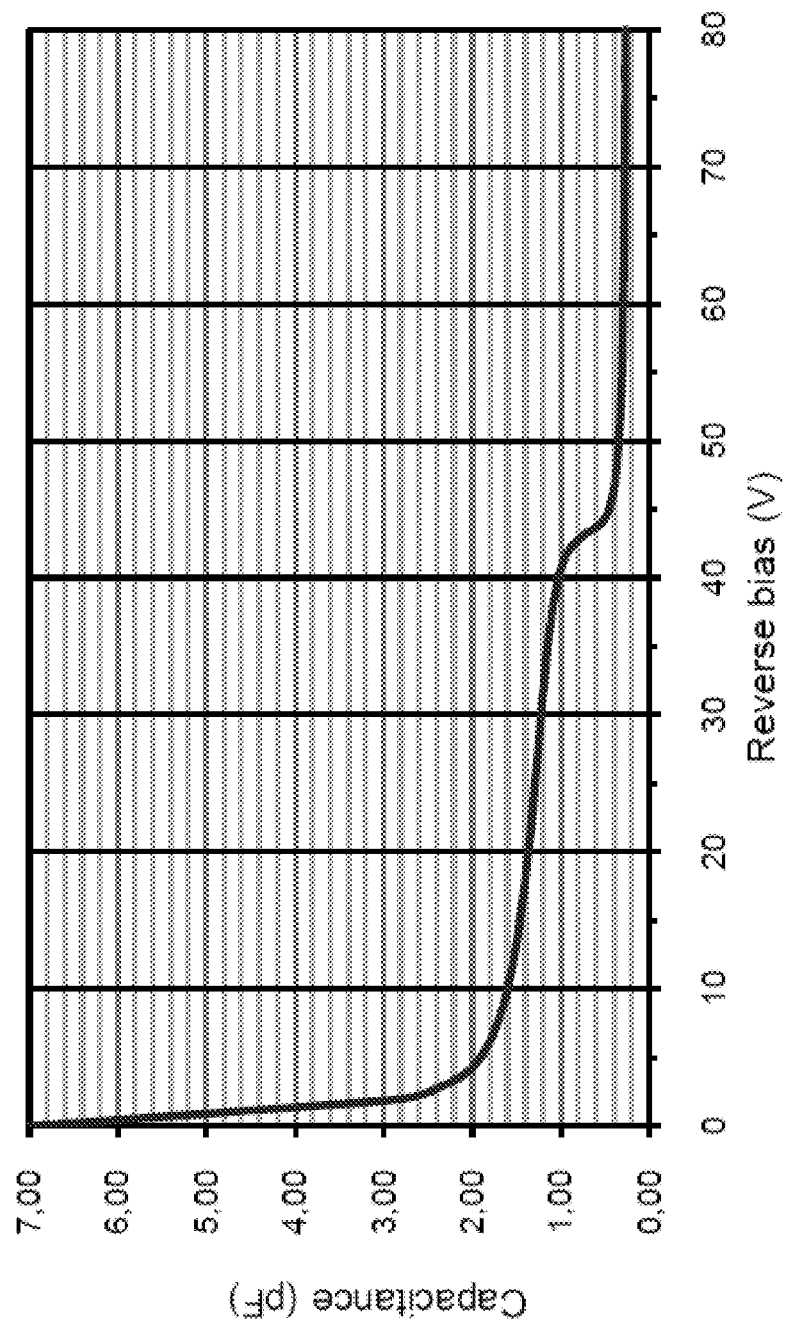
FIG. 4 is a plot illustrating an example of capacitance of an avalanche photo diode versus reverse bias.

As a consequence of varying the bias on a APD to achieve variable gain, the depletion capacitance of the APD changes. In this regard, FIG. 4 shows an example of the capacitance of the APD as a function of a reverse bias.

Figure 5:
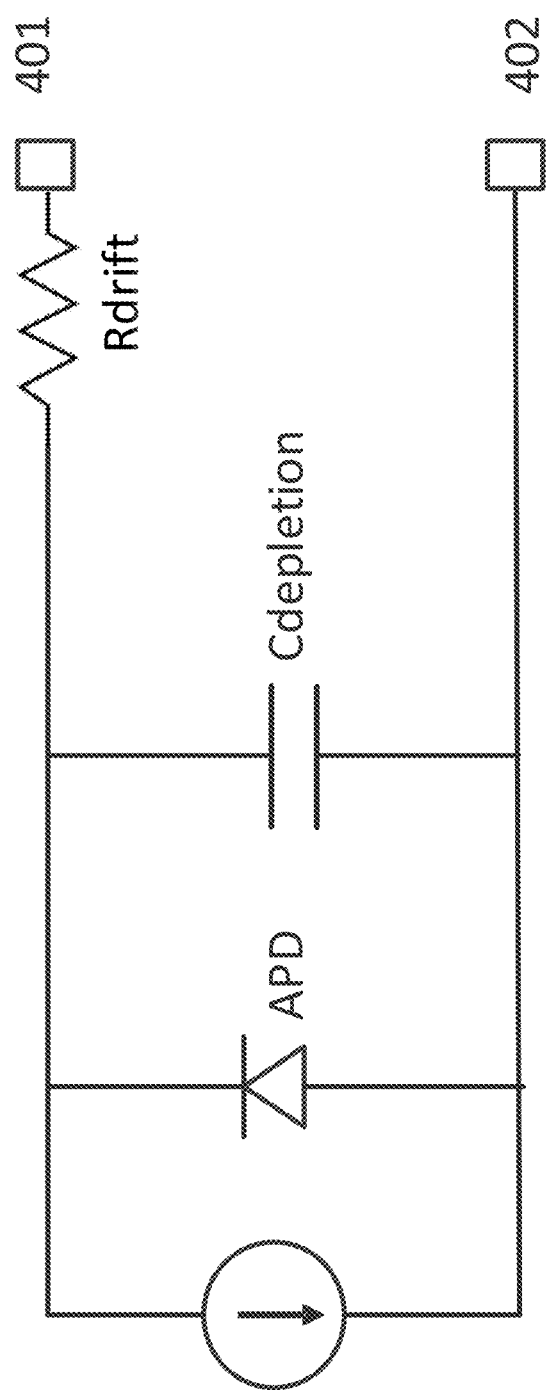
FIG. 5 shows an example of an equivalent avalanche photo diode circuit model.
Figure 6:
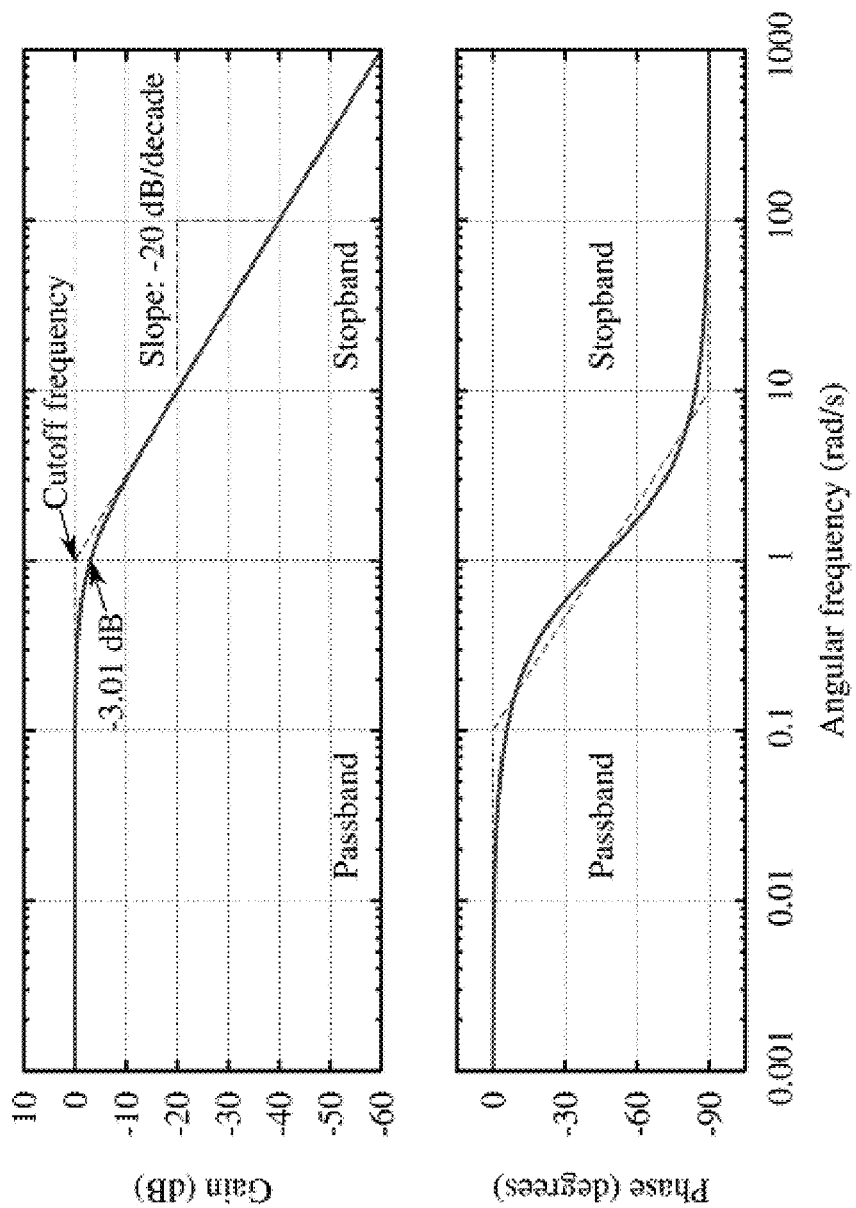
FIG. 6 are plots illustrating an example of a frequency response of an avalanche photo diode low pass filter.

FIG. 5 shows a simple equivalent APD circuit model. The circuit model consists of a basic RC low-pass filter with an APD depletion capacitance (Cdepletion) which depends on APD bias and a drift resistor (Rdrift) which has a temperature dependency. The phase response of the APD circuit is that of a RC low-pass filter as shown in FIG. 6.

A very small change in the APD bias and the corresponding depletion capacitance and temperature results in significant change in phase angle response.

As discussed above, IF is generated by mixing the laser modulation frequency with a local oscillator frequency. The IF filter (e.g., IF 214 or 215) should be a narrow bandpass filter to improve the noise in the IF receiver path. In practice, the bandpass of the IF filter should be around 1 kHz to 50 kHz. Noise of the IF filter is proportional to its bandwidth. However, it should not be too narrow to have high attenuation at passband. In this frequency range, the IF filter can be implemented using electronics with minimal interference from the environment. For example, the IF filter can be implemented using an active or passive analog filter. The IF filter can also be implemented digitally.

Figure 7:
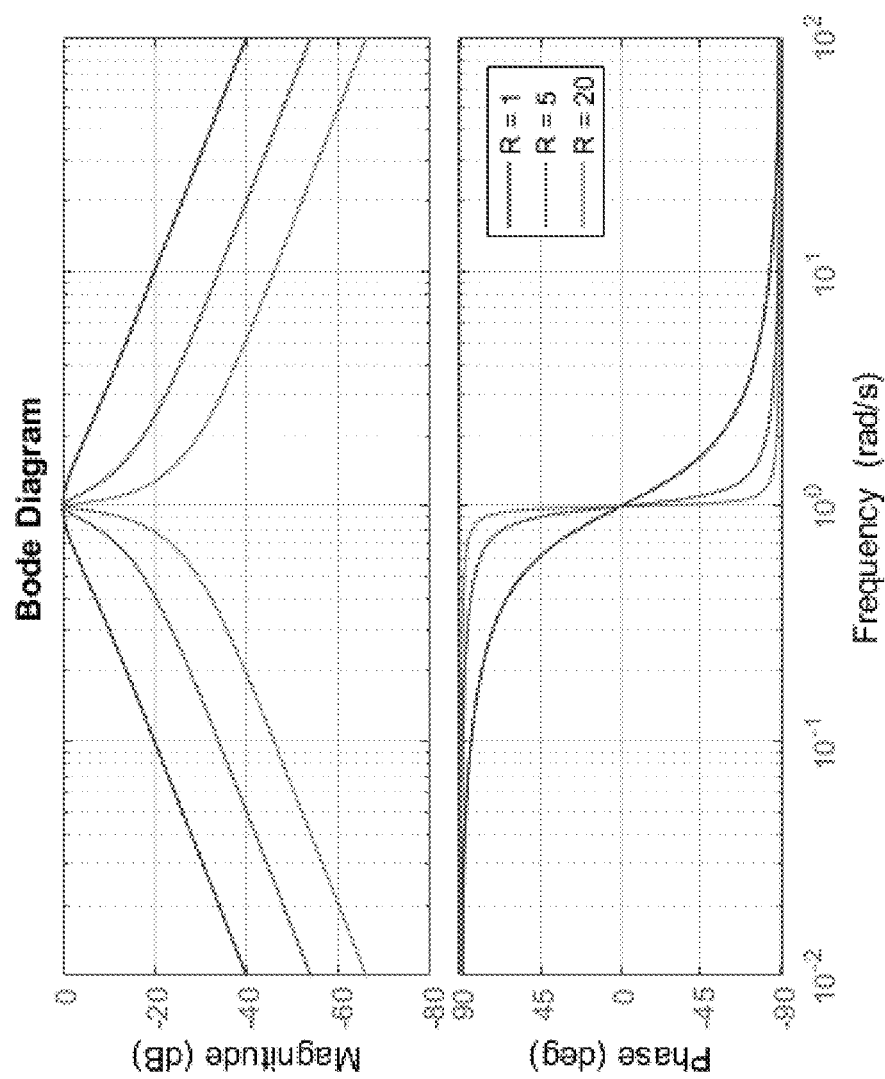
FIG. 7 shows an example of a bandpass Bode plot for an IF filter.

The bandpass IF filter also introduces its own phase error to the system. In this regard, FIG. 7 shows an example of the phase response of a bandpass filter. As can be seen in the example in FIG. 7, the phase response of the filter is particularly sensitive with respect to the frequency at the center of the passband. Environmental effects, component variations, and aging will significantly alter the phase of the resulting signal.

In addition, the center frequency of bandpass filter might have an offset with respect to the IF frequency due to mismatch of components. This mismatch can skew the phase offset in the IF phase measurement.

In address the above challenges, embodiments of the present disclosure provide systems and methods to correct the phase offset in the RF and/or IF signal path of a laser range finder caused by component mismatch due to, for example, environment (e.g., changes in temperature), process variation during manufacturing, and aging.

Figure 8:
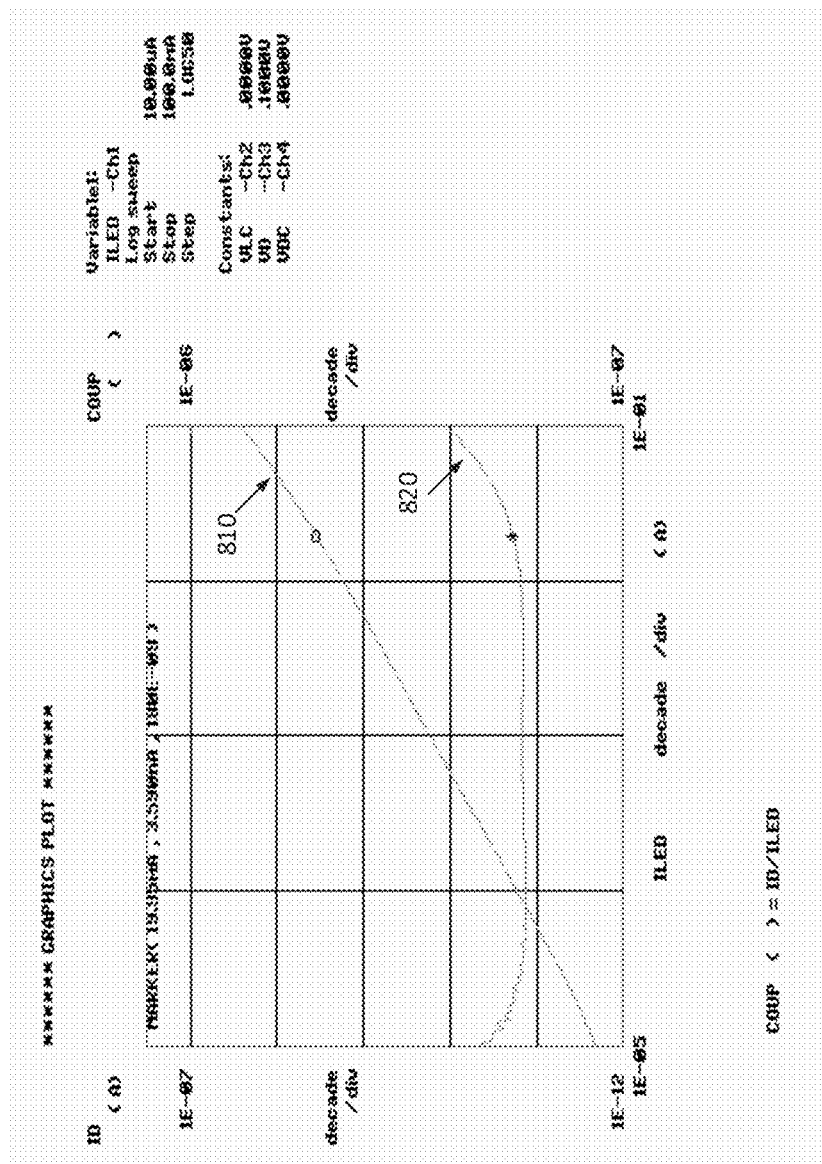
FIG. 8 is a plot illustrating measurements for a silicon LED according to certain aspects of the present disclosure.

Embodiments of the present disclosure use an "on chip" silicon LED to generate a light signal for calibration. An advantage of an "on chip" silicon LED is that the silicon LED may be integrated with other components of the range finder on the same chip (die) including the photo detectors, mixers, filters and/or amplifiers. Silicon is an indirect bandgap material. Its light generation efficiency is low compared to direct bandgap material, such as gallium arsenide. It is generally accepted that silicon LED quantum efficiency is less than $10^{-5}$. In this regard, FIG. 8 shows exemplary measurements for a silicon LED, in which the silicon LED is driven with an LED drive current and a photo detector is used to detect light emitted by the silicon LED. More particularly, FIG. 8 shows the drive current 810 and a ratio 820 of the detection current of the photo detector over the drive current (which is a measure of coupling efficiency between the silicon LED and photo detector).

In this example, the silicon LED comprises a P/N junction in Silicon On Insulator (SOI) process with a P/Nwell photodetector across a dielectrically isolated barrier. The silicon LED is fully dielectrically isolated from the photo detector. In this setup, the coupling efficiency between the silicon LED and photo detector is around $10^{-7}$. It is also shown that the coupling efficiency is essentially constant over 5 decades of LED driving current. LED current can be forward bias or reverse bias. Photo detector current is proportional to the absolute current through silicon LED junction.

In the case of laser range finder, the optical signal strength decreases proportional to $1/R^2$, and proportional to the receiver lens area intercepting the incoming photons. The received signal strength at the optical detector (photo detector) can be less than $10^{-9}$ of the laser optical power. To the optical detector/receiver of laser range finder, the silicon LED light emission/coupling can be efficiently used as a means to optical/electrically calibrate the receiver path to establish "zero path" offset resulting from environment, mismatch and aging of components used in the receiver path.

Figure 9:
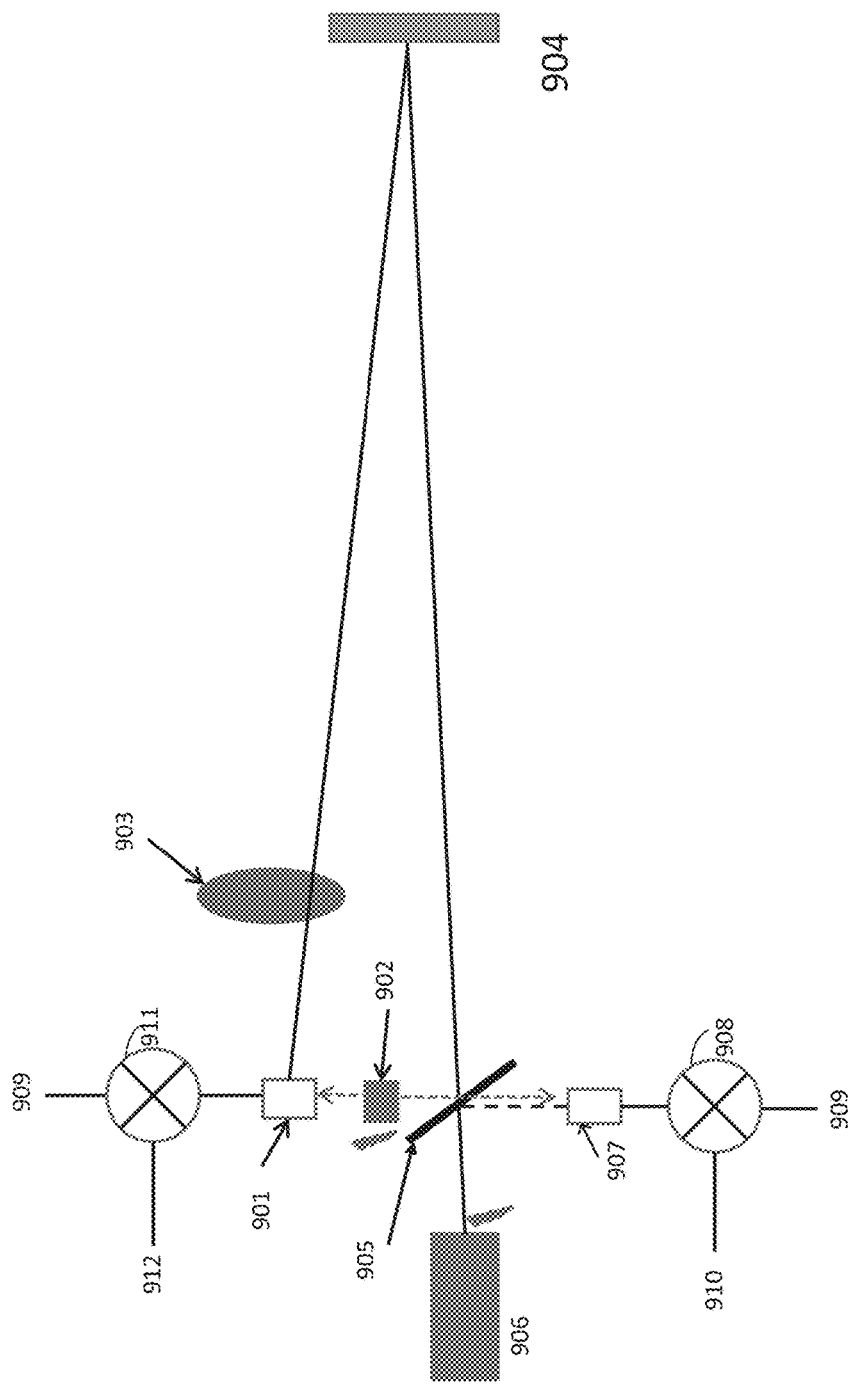
FIG. 9 shows an example of a range finder with RF and IF calibration according to certain aspects of the present disclosure.

In this regard, FIG. 9 shows an example of a range finder system including a silicon LED 902 for calibration according to certain aspects of the present disclosure. The range finder system includes a laser 906 with its light output modulated at the laser modulation frequency. The range finder system also includes a target photo detector 901 and a reference photo detector 907, each of which may be implemented with an APD. The reference photo detector 907 establishes the reference path from the laser light. The range finder system also includes a lens 905, which is represented as an optical beam splitter in FIG. 9. The lens 905 may pass most of the light signal from the laser 905 to the target 904 while scattering a small portion of the light signal to the reference photo detector 907. The surface scattering will be more than enough to be picked up by reference photo detector 907 as zero path reference. The electrical signal output of the reference photo detector is mixed in mixer 908 with local oscillator signal 909 to generate IF signal 910 of the reference path. The light signal from the laser strikes target 904 and scattered light is picked up by lens 903 to focus the reflected signal onto the target photo detector 901. The electrical signal output of the target photo detector 901 is mixed in mixer 911 with local oscillator signal 909 to generate the IF signal of the receive path 912. The IF signals in the reference path and receiver path may be filtered by respective IF filters and converted into digital signals by respective ADCs for processing by a controller. The controller may compute a phase offset measurement between the reference and receiver paths based on the received IF signals, as discussed above.

Once the laser measurement is done, the controller may shut down the laser 906. The silicon LED 902 may then be driven by a driver to generate a modulated light signal to be picked up (detected) simultaneously by photo detectors 901 and 907. The silicon LED 920 can be modulated at RF or IF frequency. The electrical signal output of the reference photo detector is mixed in mixer 908 with local oscillator signal 909 to generate IF signal 910 of the reference path. The electrical signal output of the target photo detector 901 is mixed in mixer 911 with local oscillator signal 909 to generate the IF signal of the receive path. The IF signals in the reference path and receiver path may be filtered by the respective IF filters and converted into digital signals by the respective ADCs for processing by the controller. The controller may compute a calibration phase offset between the reference and receiver paths based on the received IF signals. The calibration phase offset may be caused by component mismatch due to, for example, environment (e.g., changes in temperature), process variation during manufacturing, and aging. Thus, the controller can subtract out the calibration phase offset from the phase offset measurement to correct the phase offset measurement for the component mismatch, resulting in a corrected phase offset, which improves the accuracy of the range finder. The controller may use the resulting corrected phase offset to estimate the distance from the chip to the target.

The silicon LED 902 is able to calibrate both the photo detector phase response and electronic filter element phase response simultaneously. Light, such as background lighting on target, not modulated at exact RF and IF frequency will not be picked up by the photo detectors due to the selectivity of the receiver.

Figure 10:
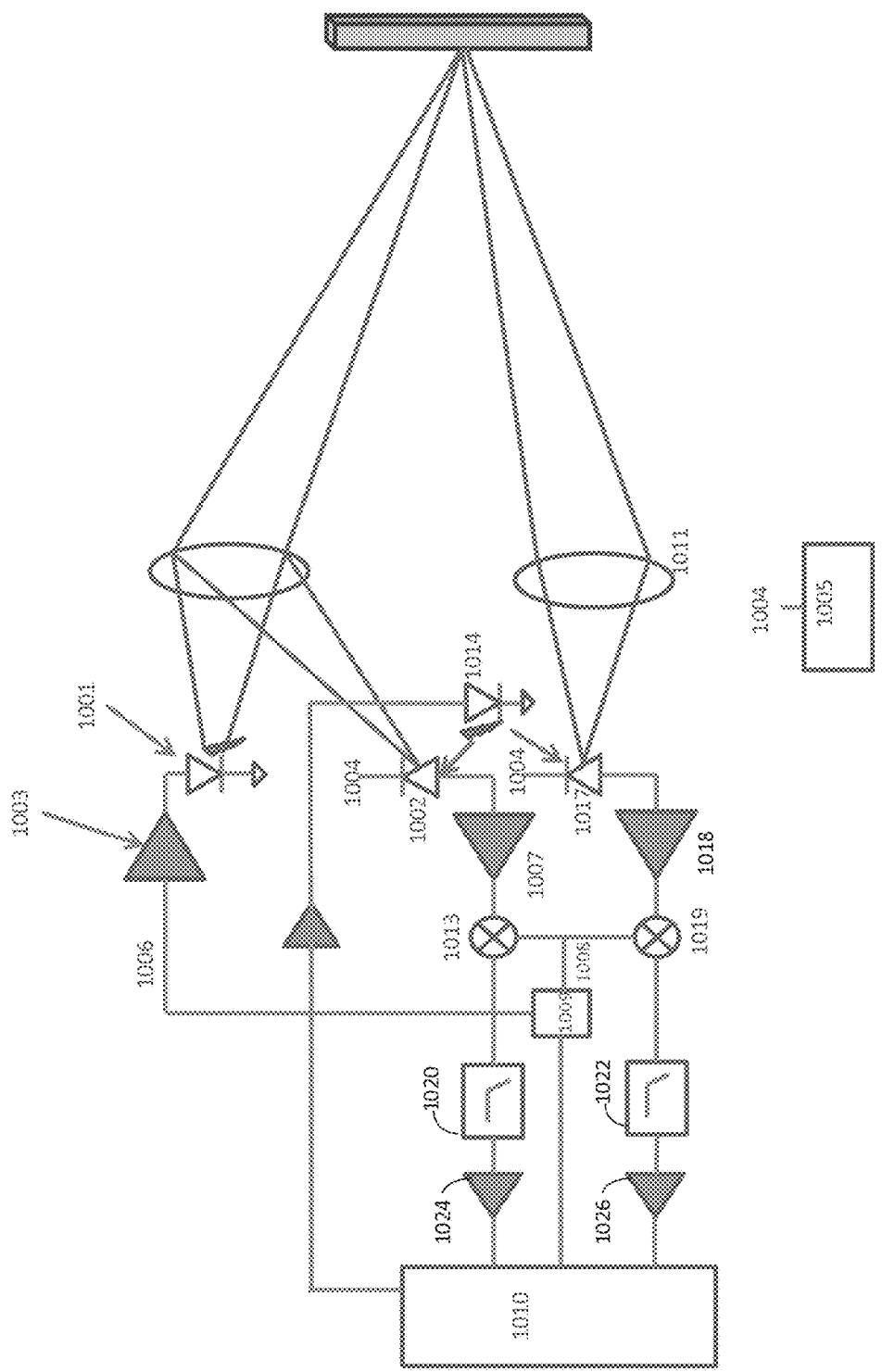
FIG. 10 shows another example of a range finder with RF and IF calibration according to certain aspects of the present disclosure.

FIG. 10 shows an example of a range finder system using an silicon LED in forward bias mode to calibrate at IF. Initially, the laser 1001 is driven by laser driver 1003 at the laser modulation frequency 1006, which may be offset from the local oscillator frequency 1008 by the IF. The modulation frequency 1006 and local oscillation frequency 1008 are generated by PLL 1009. IF frequency is controlled by controller 1010 and it is the difference in frequency between modulation frequency and local oscillator frequency. The light signal (laser beam) output by the laser 1001 is focused by lens 1011 onto the target 1012. A small portion of light is reflected off the lens surface to be picked up by reference photo detector 1002 to generate reference path signal. The photo detector 1002 may be implemented with an APD that is reverse biased by high voltage supply 1005 to adjust the multiplication factor in APD. Controller 1010 may control the high voltage supply 1005 to modulate the gain of APD as the distance and reflectivity of target changes.

The light signal strikes target 1012 and scatters. A portion of the light signal scatted (reflected) off of the target is picked up by lens 1011 to focus onto the target photo detector 1017. Each photo detector converts the respective light signal to a respective electrical signal. The electrical signals from the photo detectors 1002 and 1017 pass through a symmetrical set of TIAs 1007 and 1018, mixers 1013 and 1019, IF filters 1020 and 1022, and amplifiers 1024 and 1026 to controller 1010 to be digitized. Controller 1010 computes the phase offset between the reference and received signals to obtain a phase offset measurement.

Once the range measurement is complete, the range finder enters a calibration mode. In the calibration mode, the laser 1001 is shut down. Controller 1010 drives the silicon LED 1014 in forward bias using LED driver 1016 at IF frequency. In forward bias mode, the electrical to optical conversion is slow due to diffusion capacitance of the forward bias diode junction. In forward bias, the silicon junction voltage is also low for low power consumption. Silicon LED is fabricated in close proximity to both photo detector 1002 and 1017 to be optically coupled to both photo detectors 1002 and 1017. Each of the photo detectors 1002 and 1017 converts the light received from the silicon LED 1014 into a respective electrical signal. The electrical signals output from the photo detectors 1002 and 1017 pass through a symmetrical set of TIAs 1007 and 1018, mixers 1013 and 1019, IF filters 1020 and 1022, and amplifiers 1024 and 1026 to controller 1010 to be digitized. Controller 1010 computes the phase offset between the reference and received signals to obtain a calibration phase offset, and may subtract out the calibration phase offset from the phase offset measurement to correct for mismatches in the components at IF. Thus, small mismatches in components at IF can be zeroed out in the controller in phase offset. Controller 1010 may estimate the distance from the chip to the target using the corrected phase offset.

The sequence of measurement and calibration can be exchangeable, depending on need. Also, the frequency of calibration can be modified depending on range measurement accuracy requirement, environmental conditions, measurement time, and signal to noise ratio (SNR) of received signal at receiver.

Figure 11:
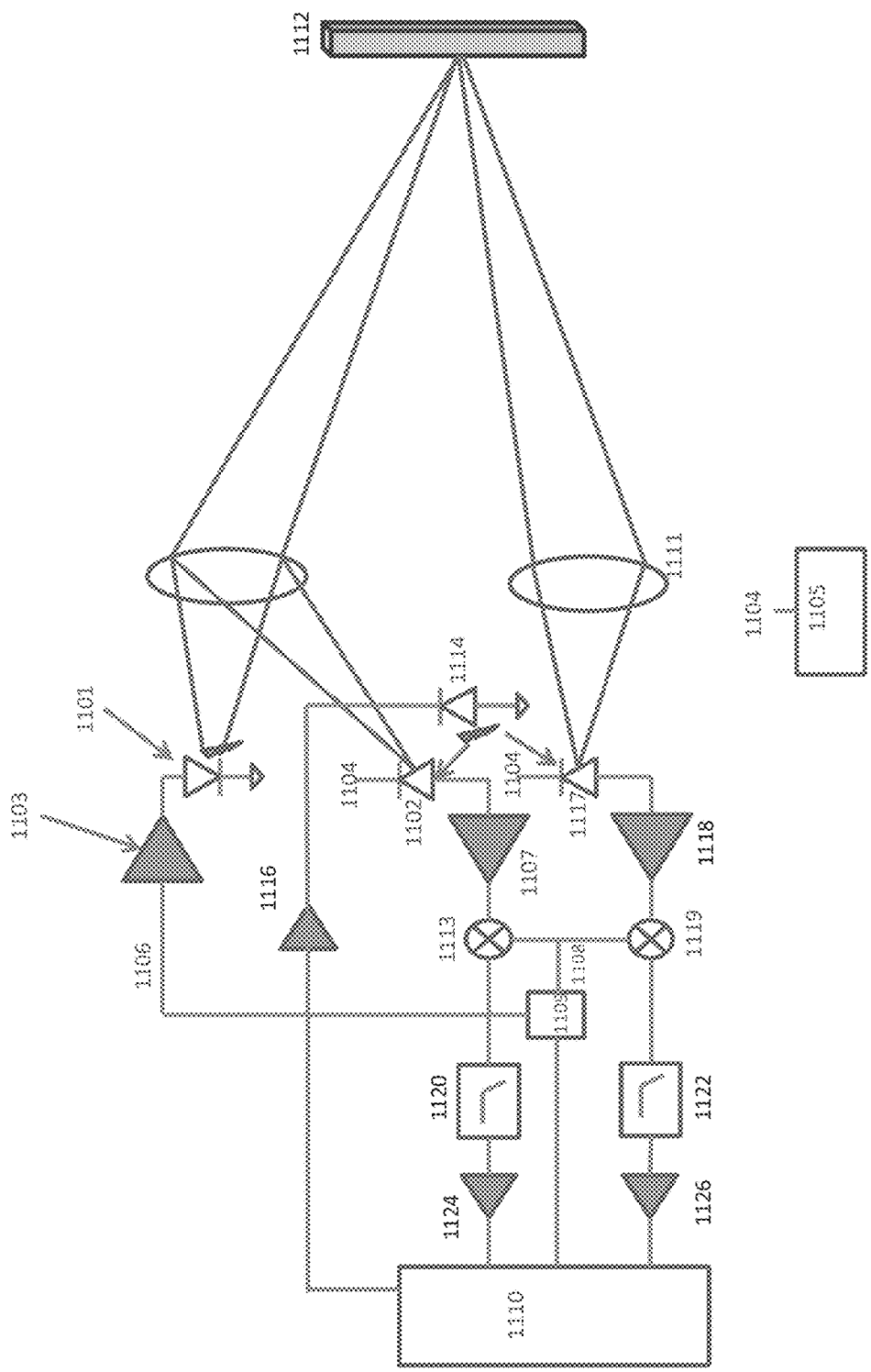
FIG. 11 shows an example of a range finder with combined RF and IF calibration according to certain aspects of the present disclosure.

FIG. 11 shows an example of a range finder system using a silicon LED to calibrate both RF and IF. The system setup is similar to that of IF calibration with exception that the silicon LED 1114 is reverse biased. In the example in FIG. 11, the silicon LED is driven in reverse bias avalanche mode. In avalanche mode, the silicon LED can generate optical signals directly at RF frequency. The quantum efficiency is in $10^{-5}$ to $10^{-6}$. Light emission is proportional to injected electrical current. The bandwidth of integrated silicon LED in avalanche mode is limited by the drift resistance and depletion capacitance of silicon junction. The reverse breakdown voltage of integrated silicon LED with modern CMOS process can range from 6V to 12V depending on CMOS process generation. Reverse breakdown voltage can be generated by a charge pump circuit in LED driver 1116. In this example, the LED river 1116 may drive the silicon LED 1114 at the LO frequency or the laser modulation frequency.

In distance measurement mode, the laser 1101 is driven by driver 1103 to generate modulated light output at modulation frequency 1106. PLL 1109 under the control of controller 1110 generates modulation frequency 1106 and local oscillator frequency 1108. As discussed above, the modulation frequency may be offset from the local oscillator frequency by IF.

The light signal output from the laser 1101 is focused onto the target 1112 by lens 1111. The lens surface reflects a small portion of light signal back to the reference photo detector 1102. A portion of the light signal is scattered (reflected) off the target 1112 back towards the receiver. The lens 1111 focuses the light signal scattered off the target to target photo detector 1117. The photo detectors 1102 and 1117 may be implemented with APDs 1102 and 1117 that are reversed biased by high voltage supply 1105 at high bias voltage 1104. High bias voltage 1104 may be adjusted to modulate the multiplication factor of the APDs. In this example, the controller 1110 may control the bias voltage 1104 of the high voltage supply 1105 to optimizes APD gain to have a good SNR per target distance and reflectivity. Each photo detector converts the respective light signal to a respective electrical signal. The electrical signals from the photo detectors 1102 and 1117 pass through a symmetrical set of TIAs 1107 and 1118, mixers 1013 and 1019, IF filters 1120 and 1122, and amplifiers 1124 and 1126 to controller 1110 to be digitized. Controller 1110 computes the phase offset between the reference and received signals to obtain a phase offset measurement.

In calibration mode, the laser 1101 is switched off. The controller 1110 drives the silicon LED 1114 in reverse breakdown using high voltage driver 1016 at RF frequency. The RF frequency can be either local oscillator frequency 1108 or modulator frequency 1106. The light output of the silicon LED 1114 is picked up (detected) by the photo detectors 1102 and 1117 in close proximity Each of the photo detectors 1102 and 1117 converts the light received from the silicon LED 1114 into a respective electrical signal. The electrical signals from the photo detectors 1102 and 1117 pass through a symmetrical set of TIAs 1107 and 1118, mixers 1013 and 1019, IF filters 1120 and 1122, and amplifiers 1124 and 1126 to controller 1110 to be digitized. The controller 1110 computes the phase offset between the reference and received signals to obtain a calibration phase offset, and subtracts out the calibration phase offset from the phase offset measurement to correct for mismatches in the components at RF and IF. Thus, small mismatches in components at RF and IF can be zeroed out in the controller in phase offset. The controller may then compute the distance between the chip and the target using the corrected phase offset. Thus, the calibration phase offset (also referred to as zero path phase offset) is applied to correct the measured phase offset to derive the accurate measurement of distance between the chip and target.

In reverse biasing the silicon LED at RF, power consumption by silicon LED will be higher than that of forward biased silicon LED used for IF calibration. However, using reverse bias at RF, components at both RF and IF can be calibrated at once.

As in IF calibration, the sequence of measurement and calibration can be exchangeable, depending on need. Also, the frequency of calibration can be modified depending on range measurement accuracy requirement, environmental conditions, measurement time, and signal to noise ratio (SNR) of received signal at receiver.

The controller according to any of the embodiments discussed above may be implemented using hardwired logic, programmable logic, and/or a processor configured to execute code that causes the processor to perform the operations discussed herein. The code may reside in RAM memory, flash memory, ROM memory, EPROM memory, EEPROM memory, registers, or any other form of storage medium known in the art. An exemplary storage medium may be coupled to the processor such that the processor can read code from storage medium and execute the code to perform the operations discussed herein.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two components. It is to be appreciated that the term "lens" as used herein covers a set of lenses configured to perform the functions of the "lens".

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

The invention claimed is:

1. A range finder system, comprising:
   a laser configured to generate a first light beam in a measurement mode;
   a silicon light emitting diode (LED) configured to generate a second light beam in a calibration mode;
   a first photo detector, wherein, in the measurement mode, the first photo detector is configured to detect a portion of the first light beam reflected off of a lens in the range finder system; and
   a second photo detector, wherein, in the measurement mode, the second photo detector is configured to detect a portion of the first light beam reflected off of an object external to the range finder system;
   wherein, in the calibration mode, both the first and second photo detectors are configured to detect the second light beam from the silicon LED; and
   wherein the silicon LED, the first photo detector, and the second photo detector are integrated on a single chip.

2. The range finder system of claim 1, wherein the first photo detector is an avalanche photo diode and the second photo detector is an avalanche photo diode.

3. The range finder system of claim 1, wherein the first photodetector is reverse biased by a high voltage supply during the calibration mode and the measurement mode.

4. The range finder system of claim 1, wherein the silicon LED is forward biased during the calibration mode.

5. The range finder system of claim 1, wherein the silicon LED is reverse biased at radio frequency (RF) range during the calibration mode.

6. A range finder system, comprising:
   a silicon light emitting diode (LED) configured to generate a first light beam in a calibration mode;
   a laser configured to generate a second light beam in a measurement mode;
   a lens;
   a first photo detector, wherein, in the calibration mode, the first photo detector is configured to detect a portion of the first light beam to generate a first reference signal, and in the measurement mode, the first photo detector is configured to detect a portion of the second light beam reflected off of the lens to generate a second reference signal; and
   a second photo detector, wherein, in the calibration mode, the second photo detector is configured to detect a portion of the first light beam to generate a first receiver signal, and in the measurement mode, the second photo detector is configured to detect a portion of the second light beam reflected off of an object external to the range finder system to generate a second receiver signal;
   wherein, in the calibration mode, the first reference signal and the first receiver signal are used to generate a calibration phase offset, and in the measurement mode, a distance between the range finder system and the object is calculated based on the second reference signal, the second receiver signal, and the calibration phase offset; and
   wherein the silicon LED, the first photo detector, and the second photo detector are integrated on a single chip.

7. The range finder system of claim 6, wherein the first photo detector is an avalanche photo diode and the second photo detector is an avalanche photo diode.

8. The range finder system of claim 6, wherein the first photodetector is reverse biased by a high voltage supply during the calibration mode and the measurement mode.

9. The range finder system of claim 6, wherein the silicon LED is forward biased during the calibration mode.

10. The range finder system of claim 6, wherein the silicon LED is reverse biased at radio frequency (RF) range during the calibration mode.

11. The range finder system of claim 6, further comprising:
    an oscillator for generating a local oscillator signal;
    a first mixer for receiving the local oscillator signal and the first reference signal to generate an intermediate frequency reference signal; and
    a second mixer for receiving the local oscillator signal and the first receiver signal to generate an intermediate frequency receiver signal;
    wherein the intermediate frequency reference signal and the intermediate frequency receiver signal are used to generate the calibration phase offset.

12. A method of calibrating a range finder system and determining a distance between the range finder system and an external object, the range finder system comprising a silicon light emitting diode (LED), a laser, a first photo detector, and a second photo detector, the method comprising:
    generating, by the silicon light emitting diode (LED), a first light beam;
    detecting, by the first photo detector, a portion of the first light beam to generate a first reference signal;
    detecting, by the second photo detector, a portion of the first light beam to generate a first receiver signal;
    determining, by a controller, a calibration phase offset based upon the first receiver signal and the first reference signal;
    generating, by the laser, a second light beam;
    detecting, by the first photo detector, a portion of the second light beam to generate a second reference signal;
    detecting, by the second photo detector, a portion of the second light beam reflected off of the object to generate a second receiver signal; and
    determining, by the controller, a distance between the range finder system and the object based on the second reference signal, the second receiver signal, and the calibration phase offset;

wherein the silicon LED, the first photo detector, and the second photo detector are integrated on a single chip.

13. The method of claim 12, wherein the first photo detector is an avalanche photo diode and the second photo detector is an avalanche photo diode.

14. The method of claim 12, wherein the first photodetector is reverse biased by a high voltage supply.

15. The method of claim 12, wherein the silicon LED is forward biased during the step of generating a first light beam.

16. The method of claim 12, wherein the silicon LED is reverse biased at a frequency within the radio frequency (RF) range during the step of generating a first light beam.

17. The method of claim 16, wherein the first light beam is modulated at a frequency within the radio frequency (RF) range.

* * * * *